March 10, 1936.   E. P. PARTRIDGE ET AL   2,033,149
PROCESS FOR THE RECOVERY OF POTASSIUM SALTS FROM MINERALS
Filed July 18, 1934
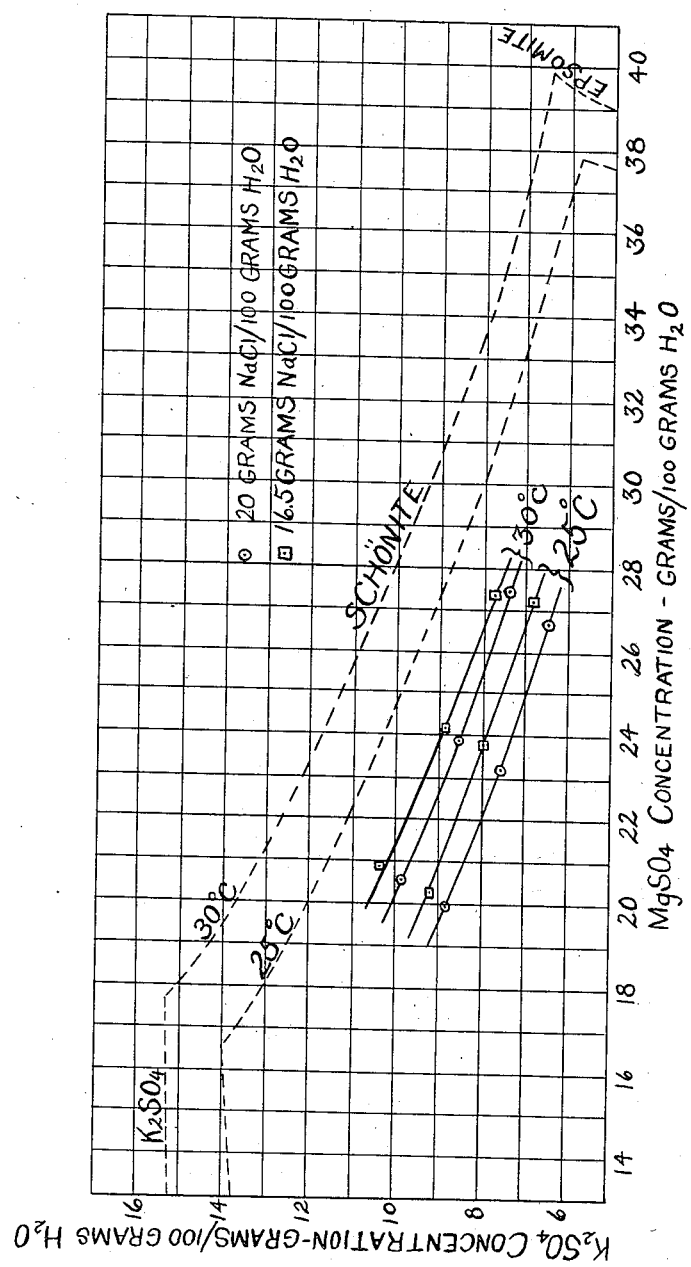
Inventors
Nathan Fragen and
Everett P. Partridge
By Geo. L. McMunn
Attorney Patented Mar. 10, 1936

2,033,149

UNITED STATES PATENT OFFICE 2,033,149

PROCESS FOR THE RECOVERY OF POTASSIUM SALTS FROM MINERALS

Everett P. Partridge, Park View Estates, N. J., and Nathan Fragen, Ann Arbor, Mich., assignors to United States of America, as represented by the Secretary of Commerce Application July 18, 1934, Serial No. 735,836

9 Claims. (Cl. 23—38)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to a method of treating a material containing potassium sulphate, magnesium sulphate and calcium sulphate in order to effect substantial separation of the potassium sulphate and magnesium sulphate from the calcium sulphate.

The primary object of the invention is to produce a valuable material of relatively high potassium content from a less valuable material of lower potassium content, such as the mineral or salt polyhalite ($K_2SO_4.MgSO_4.2CaSO_4.2H_2O$).

Another object is to effect this separation by means of a process which will consume relatively small amounts of water and which will require relatively small amounts of heat.

A further object is to obtain calcium sulphate as a by-product.

As polyhalite is the only mineral or salt containing potassium sulphate, magnesium sulphate, and calcium sulphate which is known to exist in quantities of industrial significance, the subsequent discussion and examples will mention polyhalite specifically. It should be understood, however, that since the invention disclosed herein depends fundamentally upon solubility relations the method of the invention is applicable to any mineral, salt, material or mixture containing as its chief constituents potassium sulphate, magnesium sulphate and calcium sulphate.

Prior contributions to the art have demonstrated that after polyhalite has been calcined its content of potassium sulphate and magnesium sulphate may be substantially extracted by means of hot water. Schoch (U. S. Patent No. 1,794,551, March 3, 1931) noted that when several fresh portions of calcined polyhalite were extracted successively with one and the same solution at the boiling point, and the final solution was then cooled, crystals of schönite ($K_2SO_4.MgSO_4.6H_2O$) were deposited.

We have found that a simple procedure of this nature results in a serious loss of potassium sulphate in the solid discarded at the end of the hot extraction due to the rapid formation, during the extraction, of such double salts as syngenite ($K_2SO_4.CaSO_4.H_2O$)

and/or langbeinite ($K_2SO_4.2MgSO_4$), and to the re-formation of polyhalite itself.

Utilizing water alone as the initial extracting liquid, it is not possible to simultaneously obtain efficient extraction and an extract liquor of a composition which will deposit schönite when simply cooled without removal of water.

We have found, however, that by using an initial extract liquor containing considerable concentrations of potassium sulphate, magnesium sulphate, and sodium chloride, it is possible to achieve a high degree of extraction of the potassium and magnesium sulphates and to obtain from this efficient extraction a liquor which will deposit large quantities of schönite on cooling.

We have found, moreover, that when calcined polyhalite is extracted in this manner and the extract liquor is separated and cooled to precipitate schönite, the mother liquor from the schönite crystallization when diluted with the proper amount of water will closely approximate the composition of the initial liquor and hence may be reused in a second extraction. By proper control of the quantities and compositions of the several materials it is thus possible to conduct a cyclic operation in which the original calcined polyhalite is converted into two separate solid products, schönite and calcium sulphate, and the liquor is recirculated.

In this cyclic process it is desirable to use concentrations of magnesium sulphate and sodium chloride as high as are consistent with practical and efficient extraction of potassium sulphate and magnesium sulphate, since we have found that the use of high concentrations of these substances tends to give the maximum yield of schönite during crystallization. On the other hand if the concentration of magnesium sulphate during the hot extraction becomes excessively high we have found that the formation of solid compounds containing potassium sulphate and magnesium sulphate will occur during the extraction to an extent which is undesirable because of the loss of potassium sulphate in the solid at the end of the extraction.

Moreover, if the concentrations of magnesium sulphate and sodium chloride exceed mutually dependent limits, we have found that solid compounds containing sodium sulphate and magnesium sulphate will form during hot extraction, which is undesirable since it destroys the balance in the cyclic process and causes contamination of the calcium sulphate product.

To render possible the maintenance of a desired concentration of sodium chloride in the liquors of the cyclic process it may be necessary to subject the crude polyhalite to a preliminary washing to reduce to a suitable value the sodium chloride content of the material entering the extraction step. It is apparent that in maintaining an approximately constant average concentration of sodium chloride at any point in the process, as much sodium chloride may be tolerated in the solid material entering the extraction step as it lost from the system at other points, for example in the extract liquor adhering to the calcium sulphate removed at the end of the hot extraction, and in the mother liquor adhering to the solid schönite removed at the end of the crystallization.

Efficient extraction of the potassium sulphate from calcined polyhalite by solutions containing considerable concentration of potassium sulphate, magnesium sulphate, and sodium chloride is dependent upon proper relation of the quantities of the materials used, and of the conditions during extraction, as illustrated in the following examples describing satisfactory procedures. The material used in the tests described was polyhalite from deposits near Carlsbad, New Mexico, which had been washed with cold water to remove most of the sodium chloride present as an impurity, ground and screened to give the ranges of particle size mentioned, and calcined for not more than 30 minutes with a maximum temperature not exceeding 490° C. This material after calcination was found to contain 30.3 per cent of potassium sulphate and 0.3 per cent of sodium chloride.

*Example 1*

Material prepared as described from polyhalite ranging between 30-mesh and 150-mesh was extracted as follows: 100 parts of the calcined material were extracted at approximately 100° C. with 867 parts of a liquor with the initial composition in parts by weight of 7.1 $K_2SO_4$, 21.6 $MgSO_4$, 15.7 NaCl, 100 $H_2O$, using moderate agitation. At the end of 15 minutes the extract liquor had the composition 11.9 $K_2SO_4$, 25.3 $MgSO_4$, 16.3 NaCl, 100 $H_2O$, and approximately 96 per cent of the potassium sulphate and substantially all of the magnesium sulphate initially present in the solid material were in solution.

*Example 2*

Material prepared as described from polyhalite ranging between 60-mesh and 150-mesh was extracted as follows: 100 parts of the calcined material were extracted at approximately 90° C. with 885 parts of a liquor with the initial composition of 7.6 $K_2SO_4$, 25.8 $MgSO_4$, 19.2 NaCl, 100 $H_2O$, using moderate agitation. At the end of 15 minutes the extract liquor had the composition 12.8 $K_2SO_4$, 29.9 $MgSO_4$, 19.7 NaCl, 100 $H_2O$, and substantially all of the potassium sulphate and magnesium sulphate initially present in the solid material was in solution.

*Example 3*

Material prepared as described from polyhalite ranging between 60-mesh and 150-mesh was extracted as follows: 100 parts of the calcined material were extracted at approximately 80° C. with 883 parts of a liquor with the initial composition 7.6 $K_2SO_4$, 26.0 $MgSO_4$, 19.2 NaCl, 100 $H_2O$, using moderate agitation. At the end of 15 minutes the extract liquor had the composition 12.8 $K_2SO_4$, 29.8 $MgSO_4$, 19.4 NaCl, 100 $H_2O$, and substantially all of the potassium sulphate and magnesium sulphate initially present in the solid material was in solution.

*Example 4*

Material prepared as described from polyhalite ranging between 60-mesh and 150-mesh was extracted as follows: 100 parts of the calcined material were extracted at approximately 70° C. with 882 parts of a liquor with the initial composition of 7.5 $K_2SO_4$, 25.6 $MgSO_4$, 19.1 NaCl, 100 $H_2O$, using moderate agitation. At the end of 15 minutes the extract liquor had the composition of 12.4 $K_2SO_4$, 29.8 $MgSO_4$, 19.6 NaCl, 100 $H_2O$, and approximately 94 per cent of the potassium sulphate and substantially all of the magnesium sulphate initially present in the solid material was in solution.

Single-stage batch extraction was used in the preceding illustrations. The extraction may, however, be carried out in counter-current by known means. We have found that by utilizing the counter-current principle it is possible to secure results at 90° C. with calcined polyhalite as coarse as minus 20-mesh which are comparable with those obtained at the same temperature with minus 60-mesh calcined polyhalite in a batch procedure.

The high concentration of sodium chloride in the liquors performs an essential function not only in improving extraction, but also in producing a large yield of schönite upon cooling the hot extract liquor. We have found that concentrations of sodium chloride of the general order of magnitude mentioned in the preceding illustrations depress the solubility of schönite from the value found in solutions containing only potassium sulphate and magnesium sulphate without sodium chloride. This effect is illustrated in Figure 1 which shows the concentrations obtained by crystallizing schönite at 25° C. and at 30° C. from liquors containing approximately 16 or 19 parts of sodium chloride per 100 parts of water in addition to various concentrations of potassium sulphate and magnesium sulphate. When these are compared with the equilibria values at these temperatures for solutions containing no sodium chloride, it is evident that the presence of sodium chloride in considerable concentration is beneficial in causing more potassium sulphate and magnesium sulphate to be removed from solution in the form of solid schönite during the crystallization step of the cyclic process than would be removed if these considerable concentrations of sodium chloride were not present.

We have shown that it is possible to recover schönite and a residue of calcium sulphate from polyhalite by a cyclic process involving (1) the extraction of calcined polyhalite by means of hot liquors containing considerable concentrations of potassium sulphate, magnesium sulphate and sodium chloride, these liquors being obtained in step 5 subsequently mentioned; (2) the separation by known means of the hot extract liquors from the solid residue consisting essentially of calcium sulphate; (3) the cooling of the hot extract liquors to a suitable lower temperature with the attendant crystallization of schönite; (4) the removal of the mother liquor from the solid schönite by known means; and (5) the dilution of this mother liquor with water or process solutions to produce a liquor suitable for recirculation to step 1.

Having described our invention, what we claim as new and wish to secure by Letters Patent is:

1. A method for the treatment of polyhalite which comprises extracting ground and calcined polyhalite at a temperature between 70° C. and the atmospheric boiling point by means of liquors containing from 7 to 8 parts of potassium sulphate, 21 to 26 parts of magnesium sulfate, and 15 to 20 parts of sodium chloride per hundred parts of water; separating the hot extraction liquor by known means from the solid residue comprising essentially calcium sulfate; precipitating a solid containing potassium sulfate and magnesium sulfate in approximately equimolecular ratio by cooling the extract liquor; separating the solid product from the mother liquor by known means; and using the mother liquor with additional water or dilute process liquors in the hot extraction of an additional quantity of ground and calcined polyhalite.

2. A method for the treatment of polyhalite which comprises extracting ground and calcined polyhalite at a temperature near the atmospheric boiling point by means of liquors containing approximately 7 parts of potassium sulfate, 21 parts of magnesium sulfate and 16 parts of sodium chloride per hundred parts of water; separating the hot extract liquor by known means from the solid residue comprising essentially calcium sulfate; precipitating a solid containing potassium sulfate and magnesium sulfate in approximately equimolecular ratio by cooling the extract liquor; separating the solid product from the mother liquor by known means; and using the mother liquor with additional water or dilute process liquors in the hot extraction of an additional quantity of ground and calcined polyhalite.

3. A method for the treatment of polyhalite which comprises extracting ground and calcined polyhalite at a temperature between 65° and 95° C. by means of liquors containing approximately 7.5 parts of potassium sulfate, 26 parts of magnesium sulfate, and 19 parts of sodium chloride per hundred parts of water; separating the hot extraction liquor by known means from the solid residue comprising essentially calcium sulfate; precipitating a solid residue containing potassium sulfate and magnesium sulfate in approximately equimolecular ratio by cooling the extract liquor; separating the solid product from the mother liquor by known means; and using the mother liquor with additional water or dilute process liquors in the hot extraction of an additional quantity of ground and calcined polyhalite.

4. In a method for the treatment of polyhalite, the extraction of ground and calcined polyhalite at a temperature between 70° C. and the atmospheric boiling point by means of liquors containing from 7 to 8 parts of potassium sulfate, 21 to 26 parts of magnesium sulfate, and 15 to 20 parts of sodium chloride per hundred parts of water.

5. In a method for the treatment of polyhalite, the extraction of ground and calcined polyhalite at a temperature near the atmospheric boiling point by means of liquors containing approximately 7 parts of potassium sulfate, 21 parts of magnesium sulfate, and 16 parts of sodium chloride per hundred parts of water.

6. In a method for the treatment of polyhalite, the extraction of ground and calcined polyhalite at a temperature between 65° and 95° C. by means of liquors containing approximately 7.5 parts of potassium sulfate, 26 parts of magnesium sulfate, and 19 parts of sodium chloride per hundred parts of water.

7. In a method for the treatment of polyhalite, the recovery of a solid containing potassium sulfate and magnesium sulfate in approximately equimolecular ratio by cooling to ordinary temperatures the liquors obtained by the hot extraction of ground and calcined polyhalite by means of liquors containing from 7 to 8 parts of potassium sulfate, 21 to 26 parts of magnesium sulfate, and 15 to 20 parts of sodium chloride per hundred parts of water.

8. In a method for the treatment of polyhalite the use, in the hot extraction of ground and calcined polyhalite, of mother liquors remaining after crystallization of a solid containing potassium sulfate and magnesium sulfate from the extract liquors obtained in the hot extraction of ground and calcined polyhalite by means of liquors containing from 7 to 8 parts of potassium sulfate, 21 to 26 parts of sodium sulfate, and 15 to 20 parts of sodium chloride per hundred parts of water.

9. In a method for the treatment of polyhalite employing the hot extraction of ground and calcined polyhalite by means of liquors containing from 15 to 20 parts of sodium chloride per hundred parts of water and recirculated from a subsequent step, the control of the sodium chloride content of the entering polyhalite to maintain a substantially constant concentration of sodium chloride at any desired point.

EVERETT P. PARTRIDGE.
NATHAN FRAGEN.